(12) United States Patent
Hsiao

(10) Patent No.: US 6,965,176 B2
(45) Date of Patent: Nov. 15, 2005

(54) MEASURE SYSTEM FOR LINEAR PLANAR STEPPING MOTOR

(75) Inventor: Shuen-Shing Hsiao, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 183 days.

(21) Appl. No.: 10/700,428

(22) Filed: Nov. 3, 2003

(65) Prior Publication Data

US 2005/0093377 A1    May 5, 2005

(51) Int. Cl.⁷ ............................................. H02K 41/00
(52) U.S. Cl. ........................................ 310/12; 318/135
(58) Field of Search ........................... 310/12; 318/135

(56) References Cited

U.S. PATENT DOCUMENTS

| | | | |
|---|---|---|---|
| 6,175,169 B1 * | 1/2001 | Hollis et al. | 310/12 |
| 6,320,645 B1 * | 11/2001 | Inoue et al. | 355/53 |
| 6,462,537 B2 * | 10/2002 | Kogure et al. | 324/207.2 |
| 6,724,191 B1 * | 4/2004 | Larsen | 324/329 |

* cited by examiner

Primary Examiner—Darren Schuberg
Assistant Examiner—Judson H. Jones
(74) Attorney, Agent, or Firm—Charles E. Baxley

(57) ABSTRACT

A measure system for linear planar stepping motor which form with the magnetic sensor and the stable device. The characteristic of the measure system for linear planar stepping motor was that the stable device can change the residual magnetic field in the stator from random to order.

6 Claims, 2 Drawing Sheets

MEASURE SYSTEM FOR LINEAR PLANAR STEPPING MOTOR

BACKGROUND OF THE INVENTION

1. Field of the Invention

The present invention relates to a measure system for linear planar stepping motor, linear planar stepping motor is used to move work piece, whereas the measure system serves to transmit position signals of the linear planar stepping motor to a control device during the movement of the linear planar stepping motor, so that the linear planar stepping motor will generate with position feedback during movement.

2. Description of the Prior Arts

A conventional linear planar stepping motor is moved at regular pitch by taking advantage of the interactivity between its stator and its mover. The mover is provided with variable magnetic poles, whereas the stator is provided with plural protruded teeth which are spaced by equal pitch intervals. By changing the magnetic poles on the mover, the mover can be driven to move along the stator pitch by pitch.

With the development of the science and technology, a magnetic sensor is additionally provided to linear planar stepping motor for providing precise position feedback. Normally, the magnetic sensor is comprised of protruded teeth and magnetic inductive elements and the sensor itself can produce magnetic field. When the mover is moving, by taking advantage of the variation in air-gap reluctance between the stator and the magnetic sensor, position signals can be measured and transmitted to control device so as to close the control-loop. In this way, a precise position control is obtained.

Since random residual magnetic field will be left on the surface of the respective protruded teeth of the stator after the mover passed (N pole and S pole will be produced alternatively during movement of the mover, and the caused magnetic field will also be varied with the moving speed of the rotor), the magnetic sensor is unable to precisely measure the position of the mover since it will be affected by the residual random magnetic field on the stator when it follows after the mover to move on the stator, as a result, the position control of the control-loop will be inaccurate.

The present invention has arisen to mitigate and/or obviate the afore-described disadvantages of the conventional measure system for linear planar stepping motor.

SUMMARY OF THE INVENTION

The primary object of the present invention is to provide a measure system for linear planar stepping motor, which is able to stabilize the magnetic field in the stator so as to provide accurate feedback.

A stator of a linear planar stepping motor is normally comprised of plural protruded teeth, when a mover is moving on the stator, measure system will also move on the stator along with the mover to measure the variation of flux density in the stator for getting accurate feedback information about the mover's position, such that an excellent performance of the linear planar stepping motor in terms of precise position control can be obtained.

When the mover is moving on the stator, N magnetic field and S magnetic field will be alternatively produced and the flux of the magnetic field will also be changed, residual magnetic field will stay on the surface of the stator in random order. Thereby the measure system is difficult to obtain precise feedback under the effect of the residual random magnetic field in the stator of the linear planar stepping motor. To solve this problem, the measure system of the present invention is additionally provided with a residual magnetic field stable device which can change the residual magnetic field in the stator from random to order. Through compensation process, accurate position feedback can be obtained.

Besides being provided with a magnetic sensor, the measure system of the present invention further adds a residual magnetic field stable device on the periphery of the magnetic sensor. In whatever directions the magnetic sensor moves, it will provide a sequential residual magnetic field for the stator of the stepping linear motor. Since the residual magnetic field is constant and sequential, it can be easily adjusted and compensated, so as to obtain precise position feedback.

The magnetic stable device in accordance with the present invention is provided with a N pole and a S pole. The N pole and the S pole form a loop circuit and produce magnetic field. In order to provide a sequential residual magnetic field by overcoming the original residual magnetic field on the stator with the magnetic field produced by the N and the S poles, the protruded teeth on the surface of the stator should be magnetized nearly to saturation state. In this case, after the magnetic sensor passed, the surface of the stator will be magnetized and changed into a sequential and constant magnetic field.

Thereby the residual magnetic field on the surface of the stator, after the magnetic sensor passed, is changed from random to order, so that the effect of the residual magnetic field on the magnetic sensor can be pre-measured and compensated, by this way, a precise position feedback can be obtained.

The present invention will become more obvious from the following description when taken in connection with the accompanying drawings, which shows, for purpose of illustrations only, the preferred embodiments in accordance with the present invention.

DETAILED DESCRIPTION OF THE PREFERRED EMBODIMENTS

Figure 1:
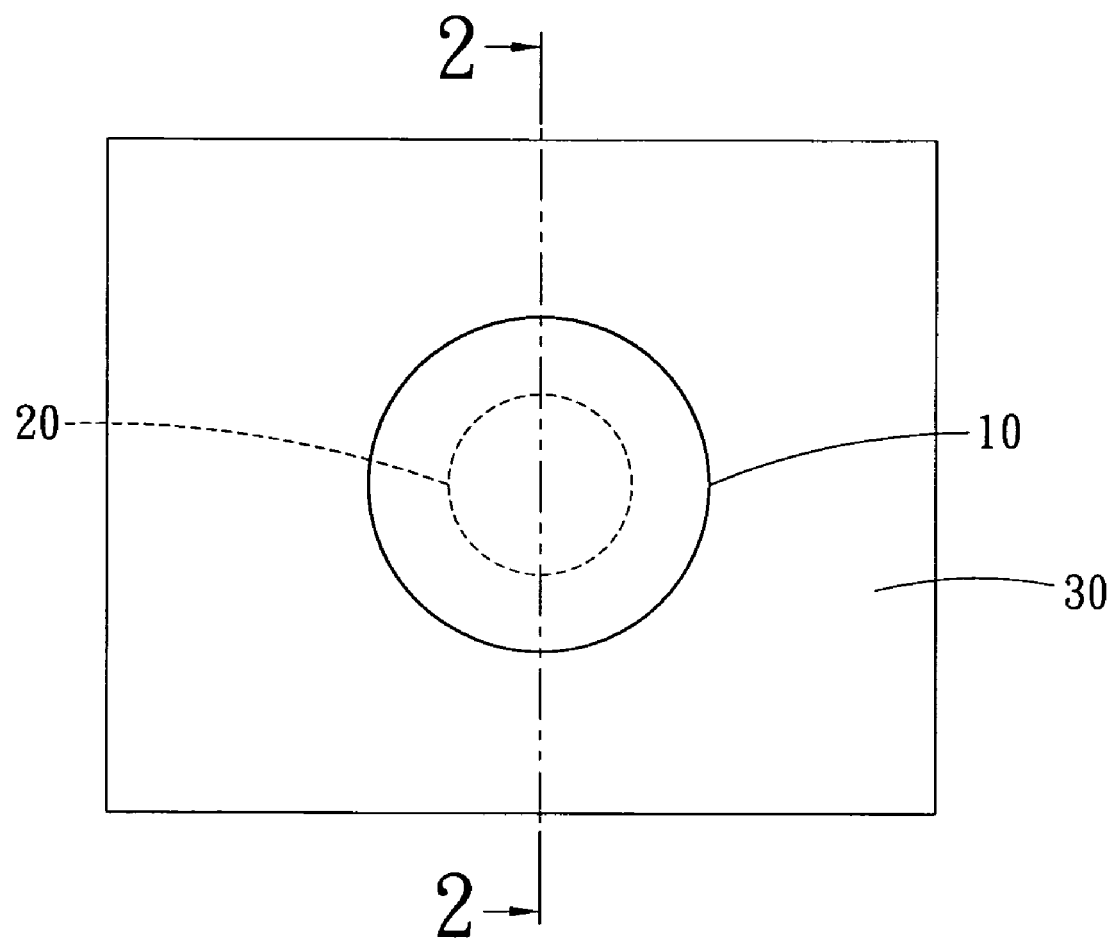
FIG. 1 is an illustrative view of a measure system for linear planar stepping motor in accordance with the present invention.

FIG. 1 is an illustrative view of a measure system for linear planar stepping motor in accordance with the present invention. Wherein the measure system includes magnetic sensor 20 and residual magnetic field stable device 10. The magnetic sensor 20 is completely surrounded by the residual magnetic field stable device 10. When the measure system moves on a stator 30 of the linear planar stepping motor in whatever direction, the variation of magnetic flux density between the stator 30 and the magnetic sensor 20 is precisely measured, so that the position variation of the mover (not shown) can be detected.

Figure 2:
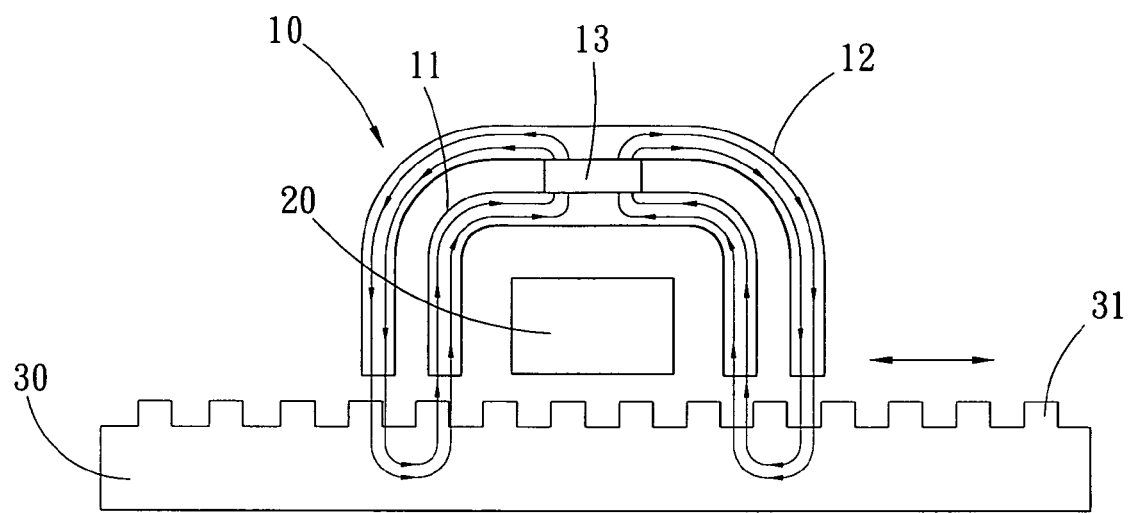
FIG. 2 is a cross sectional view taken along line 2—2 of FIG. 1.

FIG. 2 is a cross sectional view taken along line 2—2 of FIG. 1. Wherein the residual magnetic field stable device 10 is comprised of inner cover 11, outer cover 12 and magnetic field provider 13. The inner cover 11 is covered on the outer periphery of the magnetic sensor 20, the outer cover is disposed on the outer periphery of the inner cover 11. The magnetic field provider 13 is located between the inner cover 11 and the outer cover 12, which can be permanent magnet or electric magnet that has N pole and S pole, such that the inner cover 11 and the outer cover 12 can form a loop in form of "S-N" or "N-S". As shown in FIG. 2, flux lines start from N pole of the magnetic field provider 13 via the outer cover 12 and come into the stator 30, and then via the inner cover 11 the flux lines return to the S pole of the magnetic field provider 13, so as to form a loop, protruded teeth 31 on the stator 30 are magnetized and the residual magnetic field on the surface of the stator is magnetized to a sequential state. In this way, to enable the magnetic sensor 20 to precisely measure the variation of the magnetic flux density, and accordingly precise position feedback can be obtained.

While we have shown and described various embodiments in accordance with the present invention, it should be clear to those skilled in the art that further embodiments may be made without departing from the scope of the present invention.

What is claimed is:

1. A measure system for linear planar stepping motor, comprising:
    a magnetic sensor, which is used to measure flux density on stator of a linear planar stepping motor, so as to obtain precise position feedback;
    a residual magnetic field stable device, which is provided on the outer periphery of the magnetic sensor, so as to enable the magnetic sensor to measure accurate position of the stator with the measured variation of the magnetic flux density.

2. The measure system for linear planar stepping motor as claimed in claim 1, wherein the residual magnetic field stable device surrounds the outer periphery of the magnetic sensor.

3. The measure system for linear planar stepping motor as claimed in claim 1, wherein the residual magnetic field stable device has N pole and S pole.

4. The measure system for linear planar stepping motor as claimed in claim 3, wherein the N pole and the S pole of the residual magnetic field stable device are formed by permanent magnet, inner cover and outer covers with good magnetic inductivity.

5. The measure system for linear planar stepping motor as claimed in claim 3, wherein the N pole and the S pole of the residual magnetic field stable device are formed by electrical magnet, inner cover and outer covers with good magnetic inductivity.

6. The measure system for linear planar stepping motor as claimed in claim 3, wherein the residual magnetic field on the stator of the linear planar stepping motor is magnetized nearly to saturation state.

* * * * *